United States Patent [19]

Morganstein

[11] Patent Number: 5,029,196

[45] Date of Patent: Jul. 2, 1991

[54] AUTOMATED CALL SCREENING

[75] Inventor: Sanford J. Morganstein, Elgin, Ill.

[73] Assignee: Dytel Corporation, Schaumburg, Ill.

[21] Appl. No.: 217,179

[22] Filed: Jul. 11, 1988

[51] Int. Cl.[5] .............................................. H04M 3/54
[52] U.S. Cl. ..................................... 379/67; 379/142;
379/89; 379/211; 379/210; 379/214
[58] Field of Search ................ 379/210, 212, 213, 214,
379/142, 127, 246, 247, 201, 67, 88, 89, 188,
199, 200

[56] References Cited

U.S. PATENT DOCUMENTS

| | | | |
|---|---|---|---|
| 4,313,035 | 1/1982 | Jordan et al. | 379/211 X |
| 4,625,081 | 11/1986 | Lotito et al. | 379/196 X |
| 4,757,267 | 7/1988 | Riskin | 379/201 X |

OTHER PUBLICATIONS

"SPCS/Customer Premises Equipment Data Interface", Bell Communications Research, Inc., Nov. 1984.
"Calling Number Delivery", Bell Communications Research, Inc., Nov. 1984.

Primary Examiner—James L. Dwyer
Attorney, Agent, or Firm—Jerry W. Mills; Jefferson Perkins

[57] ABSTRACT

A method for facilitating call completions utilizing a call identification telephone number which is transmitted along with an incoming call. A user of the call processor of the invention can program a list of anticipated or preferred call identification telephone numbers, together with destinations to which it is desired to route the respective incoming calls. During an incoming call, the call processor matches the associated call identification telephone number with a preprogrammed number and thereby completes the call according to the programmed destination.

33 Claims, 5 Drawing Sheets

AUTOMATED CALL SCREENING

RELATED APPLICATION "Personalized Automatic Call Routing" by Morganstein, Ser. No. 217,426, now U.S. Pat. No. 5,027,384, filed concurrently herewith.

TECHNICAL FIELD OF THE INVENTION

The present invention relates in general to telecommunication methods and apparatus, and more particularly relates to call processing systems for providing call screening capabilities which are programmed and controlled by a user of the call processing system.

BACKGROUND OF THE INVENTION

New telecommunication features and options continue to be developed for facilitating voice communications, both as to expediting the communications as well as improving and increasing the amount of information passed between parties. As to the latter mentioned capability, major telephone operating companies currently provide facilities for forwarding the calling party's telephone number to the destination to thereby apprise the called party of the originating telephone number. The operational parameters of such a service are described in the technical advisory entitled, "Calling Number Delivery", Bell Communications Research, TA-TSY-000031, November, 1984. This capability is made possible by the provision of a small digital visual display or readout incorporated into the called party's telephone set. Electronic switching systems can easily identify a party placing a call, and the telephone directory number assigned to the calling party. During the ringing stage of an incoming call to a destination telephone set, the readout indicates the telephone number of the calling party, thereby giving an indication of the identity of the calling party, even before the telephone is answered. The party receiving the telephone call can then respond to the call, knowing the origination of the call and/or the identity of the calling party.

In other variations of the foregoing, there exist features in telecommunication systems which process incoming calls by first answering the call with a recorded message which invites the calling party to dial the extension number of the desired called party. After receiving the telephone number input by the calling party, the system prompts the calling party to verbally input his or her name, which verbal input is recorded by the system. The call is then completed to the called party by announcing the recorded name or identity of the calling party. On being apprised of the identity of the calling party, the called party can dispose of the call in one of various manners. For example, the called party may key into the system selected digits for completing the incoming call, or rejecting the call.

While the foregoing features increase the information communicated in connection with telephone calls and thereby enhance telecommunications, several inherent shortcomings still exists. For example, in both of the features noted above, the called party is interrupted or confronted with every telephone call, irrespective of whether he or she desires to respond to such call based upon the known identity of the calling party. In addition, new telephone sets are required for those situations when the telephone number of the calling party is displayed.

A need therefore exists for further enhancements in telecommunication call processing for allowing the called party to preprogram the communication system so as to provide personalized call routing of incoming calls. There is a further need for automatically routing telephone calls to various destinations, such as attendants, voice message centers, to the called party, etc., based upon the forwarded identity of the calling party.

SUMMARY OF THE INVENTION

In accordance with the invention, there is provided a new call processing technique which reduces or substantially eliminates the shortcomings and disadvantages of the prior art techniques. According to the disclosed invention, a communication system is preprogrammable by the called party to define a list of telephone numbers associated with potential calling parties. The telephone user-programmer can also associate with each telephone number in the list an indication of the intended disposition of the incoming call.

In the preferred form of the invention, the telephone user-programmer can designate one or more of the listed telephone numbers as important, and associate the same so that such incoming calls can be connected directly to the user. The user can also preprogram the call processor with a voice recording concerning a voice message which is retrievable by cross-referencing to the call identification number. When the user's telephone is rung in response to an incoming call which is so designated, the user is verbally notified by the preprogrammed voice message as to the identity of the calling party.

The user-programmer may designate other listed telephone numbers as less important, and preprogram the same for connection to voice store and forward facilities. In this event, the user would not directly receive such incoming calls, but rather would later retrieve any voice message left by the calling party by accessing the voice store and forward facilities.

Other listed telephone numbers can be designated as being of intermediate significance, and routed to an alternate destination, such as a secretary or a switchboard attendant. In response to such incoming calls, the call would be routed directly to the secretary, the switchboard attendant or other alternate preprogrammed destination for disposition thereof.

Incoming calls, the identity of which have no appearance in the preprogrammed telephone list, can also be programmed by the user for direct connection to the user-programmer and for announcement of the geographical area from which the call originates. In this situation, the call identification telephone number forwarded along with the incoming call can be utilized as an index for consulting a geographical table. As a result, the user's telephone can be rung in response to the incoming call and a verbal prerecorded message supplied as to the geographical area or area code from which the incoming call originates.

BRIEF DESCRIPTION OF THE DRAWINGS

Further features and advantages will become more apparent from the following and more particular description of the preferred embodiment of the invention, as illustrated in the, accompanying drawings in which like reference characters generally refer to the same parts or functions throughout the views, and in which.

DETAILED DESCRIPTION OF THE INVENTION

Figure 1:
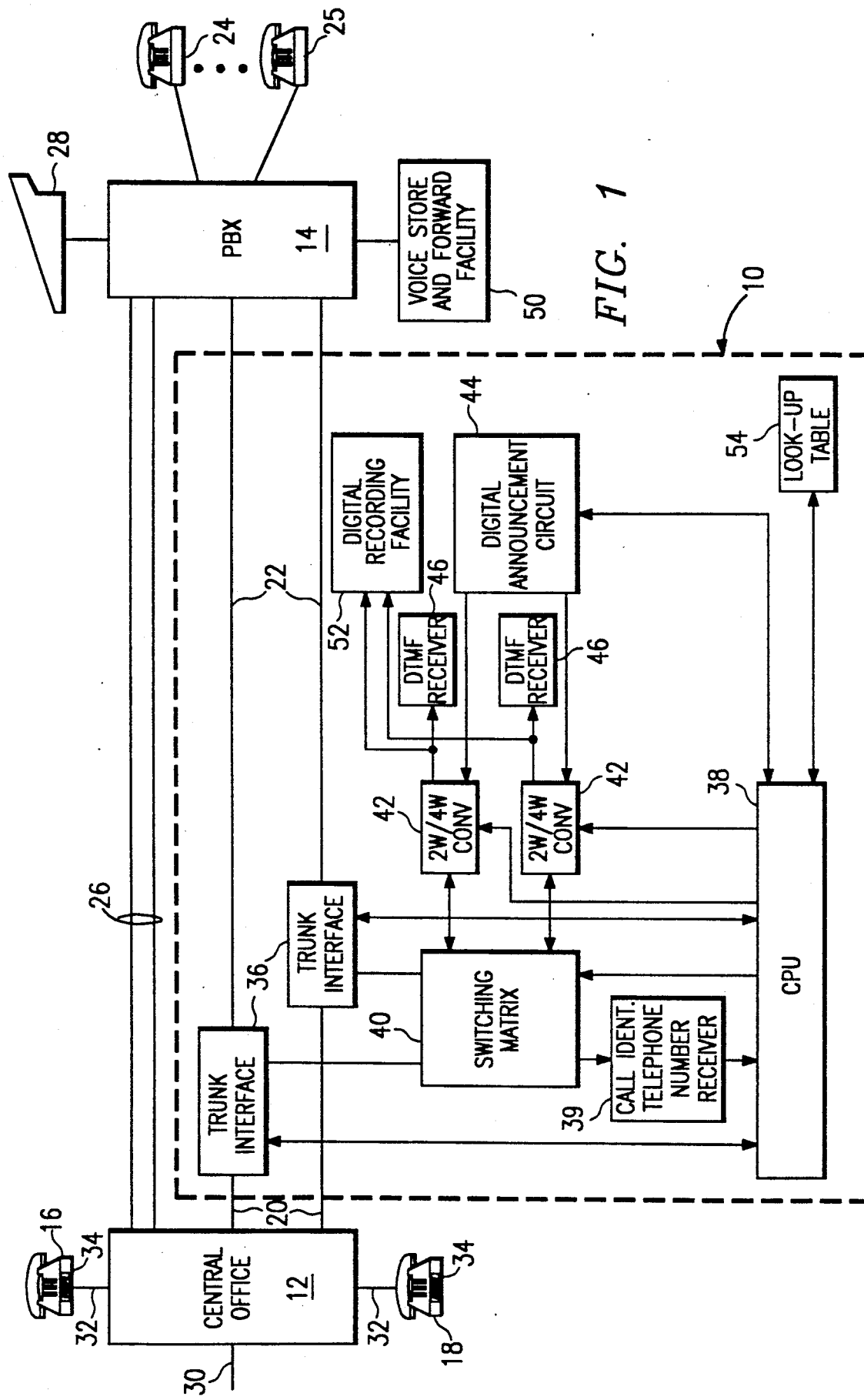
FIG. 1 illustrates a communication system in which the invention may be advantageously practiced.

FIG. 1 illustrates an exemplary environment in which the present invention may be advantageously practiced. Particularly, there is shown is a call processor 10 which functions to complete telephone calls directed from a local central office 12 to a telecommunication switching system 14. The switching system 14 is depicted as a private branch exchange (PBX) type of on-premises switching equipment; however, other switching systems such as key telephone systems, ACDs, etc., may be employed as well. Indeed, those skilled in the art may find that the call processor 10 can be adapted to function in cooperation with the on-premises switching system 14 without direct connection to the central office 12, and may even integrate the call processor functions within the on-premises switching system 14.

While FIG. 1 illustrates the call processor 10 operating in conjunction with an on-premises switching system 14, the principles and concepts of the call processor 10 may also be integrated within the central office switching system 12. The depicted local central office 12 is of the type which itself services a number of telephone sets 16 and 18.

With particular reference now to FIG. 1, the call processor 10 is shown connected on inputs thereof to the central office 12 by one or more incoming trunks 20, and connected on outputs thereof to the PBX 14 by a corresponding number of subscriber lines 22. Incoming calls from the central office 12 are therefore directed to the PBX 14, via the call processor 10 of the invention. Outgoing calls originating from the PBX telephone sets 24 or 25 are directed to the central office 12, via a number of outgoing trunks 26. The PBX 14 may be of the unattended type, or be provided with a switchboard attendant 28. The central office 12 may be of the type well known in the art for providing telecommunication services to subscribers 16 and 18 connected thereto, as well as for switching telephone calls to other central offices (not shown) by way of one or more interoffice trunks 30.

The telephone sets 16 and 18 connected by subscriber lines 32 to the central office 12 may be of the type having digital readout facilities 34 for visually displaying the telephone number identifying the calling party. As noted above, telecommunication facilities are available for transmitting, along with an incoming call, the telephone number and area code identifying the telephone set from which the call originates. Also as noted above, when such a telecommunication feature is provided, the digital display 34 provides a readout of the telephone number associated with the calling party when the telephone set 16 is being rung to alert the called party of an incoming call. Telephone sets 16 and 18 provided with such a readout 34 are more costly than standard telephones. Heretofore, each party desiring the call identification feature must have the digital readout capability 34, and thus a new telephone set.

The illustrated on-premises switching system 14 also serves a number of telephone sets 24 and 25, each of which could be of the type with the digital readout, noted above. However, the call processor 10 of the invention which provides many other features and advantages, also eliminates the need and the cost for telephone sets having such a readout.

Conventional calls are directed to the PBX 14 by way of the call processor 10 in the following manner. In response to an incoming call from a local telephone subscriber using telephone sets 16 or 18, or from a more distant calling party (not shown), the central office 12 transmits ringing signals on the incoming trunks 20 to a trunk interface 36 in the call processor 10. A CPU 38, which is connected to the plural trunk interfaces, detects the ringing signals and connects the particular trunk interface 36, via a switching matrix 40 to an idle two-wire to four-wire converter 42, commonly known as a hybrid. Once the incoming ringing is detected by the CPU 38, such ringing is tripped by controlling the pertinent trunk interface 36 to signal the central office 12 appropriately. Importantly, in response to the tripping of ringing, the CPU 38 establishes a connection from the incoming trunk 20, through the interface 36 and the switching matrix to a call identification number receiver 39. A path is thus established between the central office 12 and the receiver 39 for the corresponding central office transmission and receipt by the call processor 10 of the call identification number. Call identification number receivers, and the operational parameters and formats thereof, suitable for use in the present invention are detailed in the technical advisory entitled, "SPCS/Customer Premises Equipment Data Interface", Bell Communications Research, TA-TSY-000030, November, 1984.

The CPU 38 is then operative to select a greeting message in a digital announcement circuit 44 for transmittal through the hybrid 42, the switching matrix 40, the trunk interface 36, and the central office 12 to the calling party. Of course, the CPU 38 also trips the central office ringing so that the calling party can listen to the greeting message. In response to the greeting, the calling party is instructed to input the telephone extension number of the telephone 24 or 25 associated with the called party. The input of the extension number digits from the caller's DTMF-type telephone set are decoded by a DTMF receiver 46 and temporarily stored in the CPU 38 in digital form. The CPU 38 then provides an off-hook condition to one of the subscriber lines 22 connected to the trunk interface 36. The on-premises switching system 14 responds to such off-hook condition by sending a dial tone on the subscriber line 22, whereupon the CPU 38 outpulses the stored digits in DTMF form to the on-premises switching system 14. The on-premises PBX switching system 14 then effects a connection between the subscriber lines 22 and the selected telephone set 24 or 25 of the called party. In like manner, the CPU 38 of the call processor 10 provides a cut-through in the trunk interface 36 between the incoming trunk 20 and the subscriber lines 22, thereby providing an overall communication path between the calling party and the called telephone set 24 or 25. The call processor 10 is described in more detail in U.S. Pat. No. 4,696,028, the subject matter of which is incorporated in its entirety herein by referenc As noted above, where the call processor is configured for connection to the switching system only by subscriber lines 22 the incoming calls are routed directly to the switching system 14 by the incoming or other types of trunks 20. With this alternate configuration, the PBX switching system 14 would respond to incoming calls by routing the same to the call processor. The call processor of the invention then processes such calls in the manner described below, and communicates with the PBX switching system 14 by applying hook-flash signals to the subscriber lines 22. In this manner, the call processor is initially connected to the central office 12 to receive the call identification number, then to the calling party to transmit prerecorded voice prompts and receive digit information concerning which telephone extension 24 or 25 to which the caller desires to be connected. The call processor 10 can receive the telephone extension number from the calling party, outpulse such extension to the PBX 14 on the subscriber lines 22 and then go on hook. In response to such action, the PBX 14 provides an automatic connection between the calling party and the desired extension 24 or 25.

Briefly summarized, the present invention allows a telephone user associated with the on-premises switching system 14 to program the call processor 10 to direct incoming calls to various destinations, depending upon the identity of the calling party. Such destinations may comprise the telephone set 24 or 25 defining the destination originally contemplated by the calling party, the switchboard attendant 28, an alternate destination such as a secretary of the telephone user, or a voice store and forward facility 50. Voice store and forward facilities may be employed, such as the type disclosed in U.S. Pat. No. 3,931,476, by Matthews. Of course, many other destinations or alternate facilities may be employed for routing the incoming calls. Shown also is a digital recording facility 52 for storing, in digital form, voice messages input into the call processor 10 by the telephone user of the on-premises PBX switching system 14. The programming of the call processor 10 by the user thereof is accomplished using a look-up table 54 which cross-references call identification numbers to destinations.

A telephone user, for example, Mr. Smith, may desire to program the call processor 10 such that when a call identification telephone number is forwarded by the central office 12 to the call processor 10, and identified by the call processor 10 as being of the type which should be routed directly by Mr. Smith, such calls will be forwarded directly to Mr. Smith's telephone 24. For other call identification telephone numbers which can be taken care of by the deposit of a voice message, Mr. Smith can program the call processor 10 to route such incoming calls for connection to the voice store and forward facility 50. For other incoming calls from calling parties which can be handled without Mr. Smith's intervention, Mr. Smith can program the call processor 10 to route such calls to his secretary's telephone. The call processor 10 can be programmed to redirect yet other designated calls to the switchboard attendant 28.

It should be understood that the user of the on-premises PBX switching system 14 can program the call processor 10 according to the best destination which he or she contemplates, in accordance with the identity of the calling party. However, circumstances can change such that, for example, calls previously programmed for routing and handling by the alternate destination can no longer be efficiently disposed of as such. One situation may be that a customer has questions which are of a nature which cannot be routinely handled by the secretary or the person situated at the alternate destination. In such event, the call processor 10 of the invention is programmable, at will, to provide a new routing scheme for those calls needing the same. There also may be situations in which call identification telephone numbers are not available and thus not forwarded along with incoming calls to the call processor 10. In such situations, the call processor 10 can be programmed to handle and route such calls in an appropriate manner.

Figure 2A:
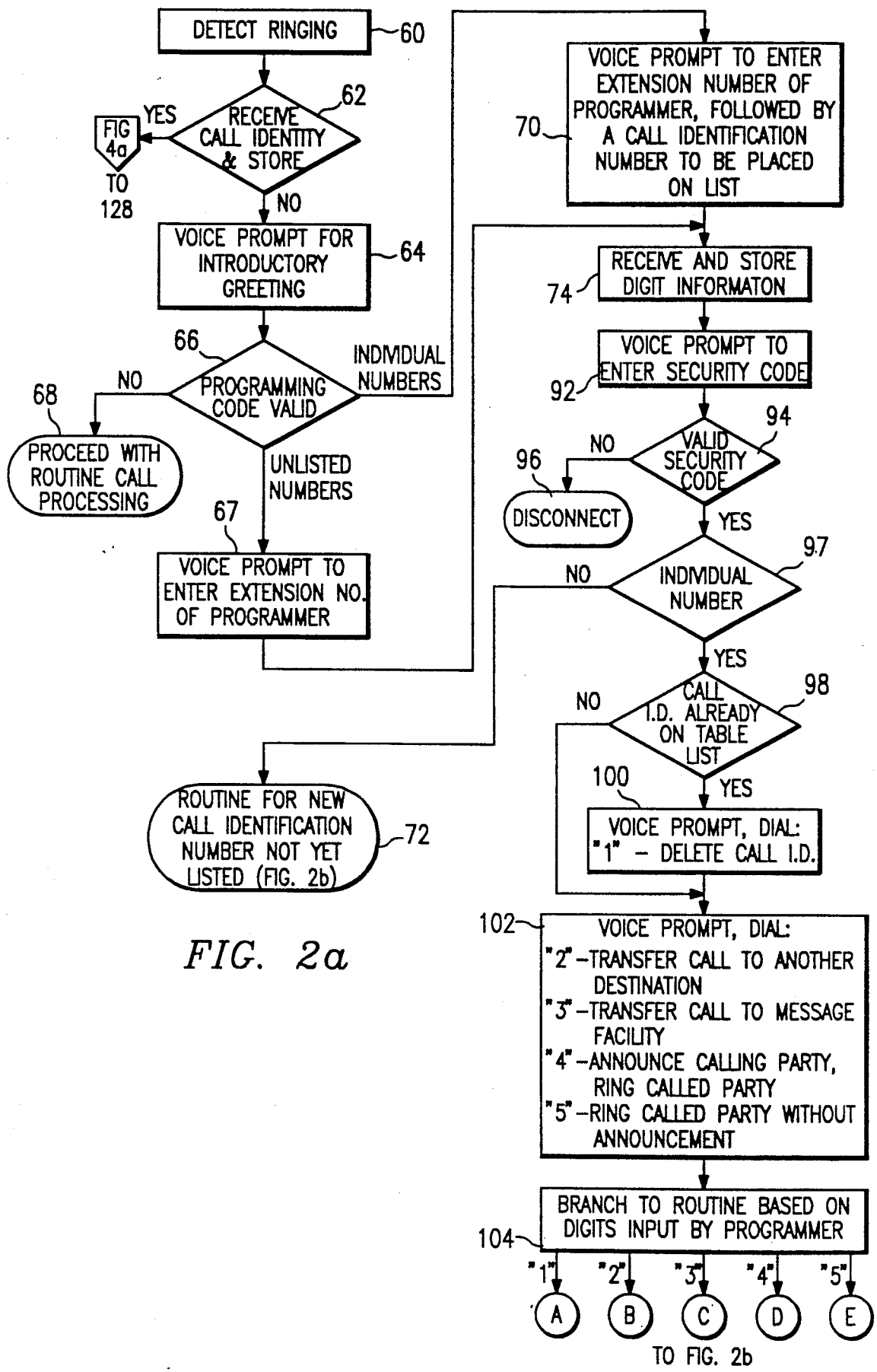
FIGS. 2a and 2b are program flow charts illustrating the major steps taken by a telephone user in programming the communication system to provide the features and advantages of the invention.
Figure 2B:
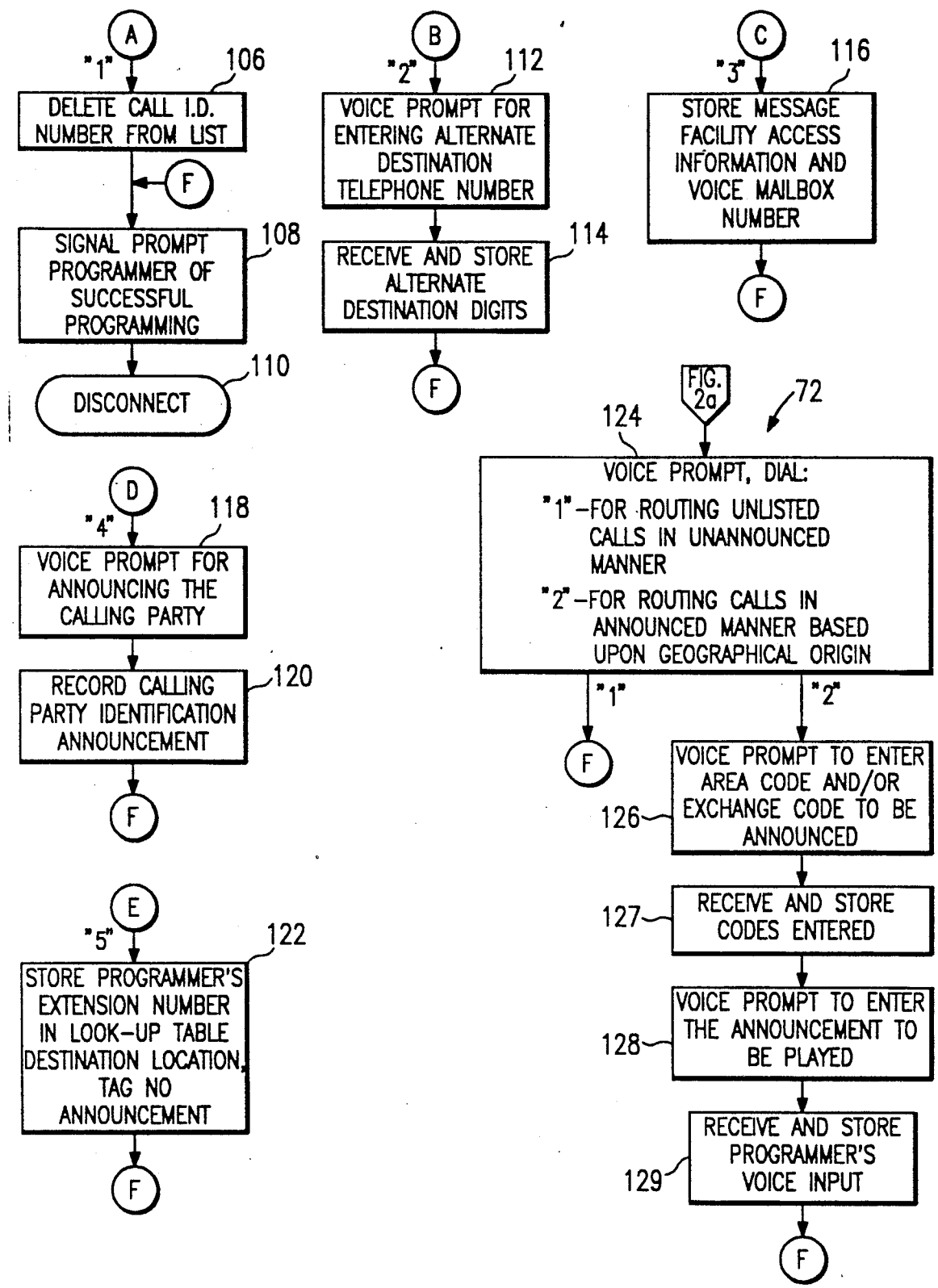

FIGS. 2a-2b illustrate the software routine for allowing the call processor 10 to be programmed by a telephone user to route incoming calls to desired destinations, based upon call identification telephone numbers accompanying the incoming calls. In order to initiate the programming procedure, the user-programmer must first establish a communication path to the call processor 10. This can be done by seizing an outgoing trunk 26 and dialing the directory number of the on-premises PBX switching system 14. The central office 12 will receive the call and switch the same to the call processor 10 on the incoming trunk 20. User-programmers of the call processor 10 can also remotely program the processor by completing a call thereto via the interoffice trunk 30. Also, some of the trunk interfaces 36 may be directly connected as an extension to the PBX 14 so that a user-programmer served by the PBX need only dial the extension to which the call processor 10 is connected, in order to gain access to the call processor 10.

With reference first to FIG. 2a, the CPU 38 detects ringing signals generated by the central office 12 and directed to the call processor 10 on the incoming trunk 20. This is shown in block 60 of the flow chart. As a result, the CPU 38 connects a call identification telephone number receiver 39 through the trunk interface 36 to the incoming trunk 20, thereby decoding and storing the call identification telephone number transmitted by the central office 12. Such a receiver 39 may be dedicated, as shown, and comprise a DTMF receiver for decoding the identification number and converting the same into digital form. In those situations where the call identification number comprises a digital transmission, a corresponding digital receiver can be connected to the trunk 20 to receive the digital signals. In either case, the call identification number receiver 39 is coupled to the CPU 38 for passing the resulting digital information when interrogated by the CPU 38. In the alternative, the DTMF receiver 46 may be utilized to receive the call identification number, digitize it, and pass it to the CPU 38. General purpose multifrequency (MF) receivers can also be adapted and appropriately enabled to respond and store the call identification digits when transmitted subsequent to the initial ringing of the trunk 20.

Block 62 of the flow chart depicts the CPU operation for providing the call identification receiver decoding and storing facilities. If the incoming call is accompanied with a call identification number, the program branches to a routine for processing routine incoming calls according to the invention. On the other hand, if no call identification number is detected, such as when the processor 10 is being programmed by a local telephone user, control of the system is branched to block 64. Other routines and techniques may be utilized to distinguish between conventional incoming calls and programming calls. According to program block 64, the call processor 10 transmits a voice prompt to give the programmer an introductory greeting. Such a voice prompt may be selected from the digital announcement circuit 44. In addition, the voice prompt instructs the programmer to input a code to place the call processor 10 in a mode for user programming. If no code or an invalid code is input by the programmer, as noted in program flow block 66, processing branches to block 68 where call processing proceeds in accordance with that described in U.S. Pat. No. 4,696,028. If, on the other hand, the code input by the programmer signifies a programming mode for developing a personalized directory or list of call identification telephone numbers and associated call routes, the program branches to block 70. Also as shown, if a code input by the programmer signifies the development of call routing procedures for call identification telephone numbers not previously listed by the programmer, the control of the CPU 38 is branched to a routine 72, via program block 67, in which the programmer then inputs information to determine the routing of such calls. The noted programming codes input by the programmer are, of course, different.

Figure 3:
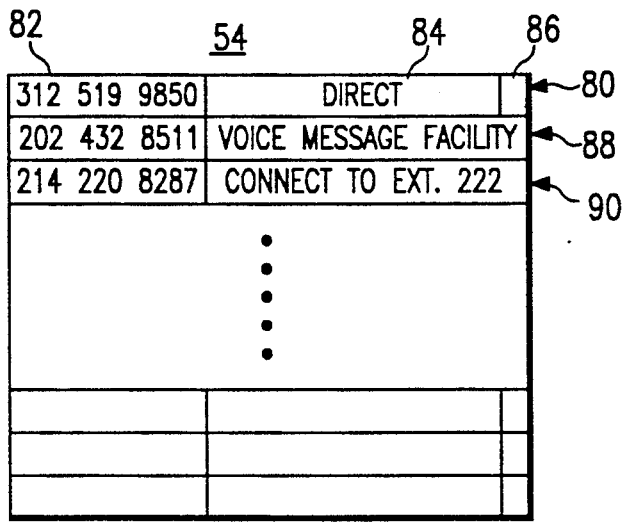
FIG. 3 is an exemplary look-up table resident in the call processor of the invention for indexing call identification numbers to call routes, as programmed by a telephone user of the call processor.

Assuming for the purposes of example that the programmer desires to develop a list of call identification telephone numbers and associated program call routes, the appropriate code is input and control is branched to block 70. According to block 70, the CPU 38 provides a voice prompt to the programmer to enter his or her telephone extension number, followed by a call identification number to be placed on the list. A predefined time interval may be used, or other non-numeric digit may be keyed in by the programmer to separate the extension number from the call identification telephone number, thereby allowing the call processor 10 to distinguish the end and start of each such digit string. The call identification number is then stored at block 74 in the look-up table 54. The look-up table 54 may comprise a random access memory accessible by the CPU 38 for both storing and retrieving digital information registered therein. While various look-up tables or other cross-referencing functions and apparatus may be utilized, FIG. 3 depicts a look-up table 54 for cross-referencing call identification numbers with call route destinations. The look-up table 54 such as shown may be utilized for each user of the call processor 10 desiring to route calls according to the identity or geographical location of the calling party. The table 54 includes a number of entries, such as 80, each having a call identification telephone number location 82 cross-referenced to a call route destination location 84. Of course, the data entered into the table 54 by the programmer would be by the CPU 38 to binary form, rather than the form depicted.

The destination entry 84 may be any type of binary string which is unique for carrying out a call processing function to connect the calling party directly to the called party, as shown by the entry in the destination location 84 of the first programming table entry 80. A programmable tag bit field location 86 may be utilized to indicate whether or not the called party is to be verbally informed of the identity of the calling party. If so, the CPU 38 retrieves a corresponding message from the digital recording facility 52 indicating the telephone number or other identity of the calling party. The tag bit field 86 may be characterized by plural bit locations, and contains the address of the particular prerecorded message which is found in the digital announcement circuit 44.

The table 54 is typically programmed to register all the call identification numbers and associated call route destinations desired by the programmer. Table entry 88 indicates that an incoming call having a call identification number of (202) 432-8511 is to be connected to the programmer's personal message mailbox of the voice messaging facility 50. Table entry 90 is shown programmed to connect an incoming call having a call identification number of (214) 220-8287 to the alternate destination assigned to telephone extension 222. Provisions may also be made in the call identification number location 82 part of the table 54 to indicate that whole blocks or portions of a block of numbers are all to be routed to a specific destination. For example, the call identification number location 82 can be programmed to enter 312 xxx-xxxx so that all calls coming from area code 312 are to be routed to the same destination designated in the corresponding call route destination location 84 portion of the table entry. The exemplary call route destination location 84 of table entry 80 signifies that the incoming call associated with the noted call identification number is to be connected directly to the user-programmer's telephone set 24 or 25.

Referring again to FIG. 2a, and according to program flow block 92, a voice prompt is caused to be transmitted by the CPU 38 to the programmer to input a security code employed to confirm that the programmer is authorized to program the call processor 10. Such an authorization can be initially programmed in the call processor 10 by forming a list of all authorization security codes which are required for each user for programming the call routing feature of the invention. For example, it may be desirable to prohibit certain users of the on-premises PBX switching system 14 from utilizing the features of the present invention. In order to verify whether there exists such an authorization, the CPU 38 compares at block 94 the authorization security code input by the programmer with that stored in a look-up table (not shown). Upon confirmation thereof, the call processor 10 continues with the programming. If there is no correspondence found between the authorization security code input and one found in the authorization look-up table, program control branches to block 96 where the programmer is disconnected.

On the finding of a valid authorization security code, the processor CPU 38 branches to decision block 97 where the determination is made whether or not the number to be programmed is an individual number. If the finding is in the negative, then the number must be an unlisted number, whereupon the program branches to the noted program routine 72. Such a routine is described below. It should be noted that when the program control branches in the noted manner from block 67, the table 54 will not be consulted. Rather, the extension number of the programmer is simply stored and then security code validation is checked.

For individual numbers, the processing continues with block 98 where it is determined whether the call identification telephone number input by the programmer already has an appearance on the list of table 54. If the decision is in the affirmative, the CPU 38 issues a voice prompt to the programmer to dial "1" to delete this number from the call identification telephone number list, as shown in block 100. Program flow then proceeds to block 102, as it otherwise would have if a negative determination were made in block 98, to provide yet other instructional voice prompts to the programmer. The additional voice prompts may be in the nature of the following. "Dial 2 to direct incoming calls to another number. Dial 3 to route incoming calls to the voice message facility. Dial 4 to announce the identity of the calling party and ring your extension telephone number. Dial 5 to ring your extension telephone without announcing the call." It can be appreciated that such an instructional prompt can be expanded to cover other call route destinations.

According to program flow block 104, the CPU 38 branches to the appropriate routine, depending upon the digit input by the programmer. If, for example, the programmer entered the digit "1", program control would branch to block 106 where the call identification telephone number is deleted from the list. This is shown in FIG. 2b. From block 106, the CPU 38 executes the instructions associated with block 108 by advising the programmer with a tone acknowledgment that the delete operation was successful. Such a tone may be any one of a variety of audible tones designated for such an acknowledgment indication. After deleting the call identification telephone number from the list, the programmer is disconnected at block 110.

If the digit "2" was input by the programmer, a further voice prompt would be transmitted to the programmer at block 12, advising the entering of a telephone extension number, or other seven-digit directory number which defines the alternate designation to which calls are to be routed. The DTMF digits are entered by the programmer and stored at block 114 in the look-up table 54 in association with the call identification number programmed for that table entry. The successful storing of the alternate designation digits is confirmed by the return of the tone acknowledgment, as indicated in block 108.

The input of the digit "3" by the programmer signifies that an incoming call accompanied with a call identification telephone number is to be transferred to the voice messaging facility 50, as noted by program block 116. The particular voice mailbox of the store and forward facility 50 is accessed utilizing the extension number input by the programmer in response to the voice prompt of program flow block 70. Access to voice store and forward facilities by call processors, such as described above, is described in more detail in co-pending U.S. application entitled "Integration of Voice Store and Forward Facility" filed Apr. 17, 1987, Ser. No. 40,564. The disclosure thereof is incorporated herein in its entirety by reference thereto. The programming of this option is shown by block 116, which is terminated by the tone acknowledgment 108.

As an additional option to the programmer of the call processing system 10, the input of the digit "4" causes the processor to perform the function illustrated in block 118. According to this feature, a voice prompt is dispatched to the programmer instructing the verbal input of the name or identity which should be announced to the telephone user of the on-premises PBX switching system 14 in response to certain incoming calls. Such a verbal input may be in the nature of "Alex Jones from Chicago is calling." Thus, when Alex Jones places a telephone call to Mr. Smith, the call identification telephone number of Alex Jones will be forwarded from Chicago to the call processor 10. When Mr. Smith's telephone set 24 is rung in response to the incoming call, Mr. Smith can pick up the handset, in which event the verbal input message will be retrieved from the recording facility 52 and repeated, indicating that Mr. Alex Jones from Chicago is calling. The voice message input according to program flow block 118 is digitized and stored in the digital recording facility 52, as noted in block 120. Program flow is directed to block 108 where the tone acknowledgment is returned to the programmer, signifying the successful accomplishment of programming the noted feature.

According to the last of the exemplary by the programmer causes the CPU 38 to branch to block "5" 122. The function associated with this block is that the CPU 38 stores the digit information corresponding to the call identification telephone number, as well as the programmer's extension telephone number input according to the voice prompt of block 70. As with the other noted optional call routes, program flow is then branched back to block 108 for tone acknowledgment.

The final destination programmable in accordance with the preceding example can be reached as a result of the call processor routing from block 72 (FIG. 2a) to program flow block 124 (FIG. 2b). According to this programmed routing of the incoming call, a voice prompt is transmitted to the programmer, indicating options for completing the call. First, a transmitted voice prompt may be in the nature, "Dial 1 if you want calling parties not listed to be unannounced, or, dial 2 if calls from telephone numbers not listed are to be announced with your prerecorded phrase based upon an area code and/or an exchange code." The called party can then select such option by dialing the digit "1" or "2", whereupon program control is transferred respectively either to block 108 or to block 126. The input of a digit "1" causes the call processor to transfer to block 108 where call processing continues as described above in connection with such block. If the digit "2" is input by the user-programmer, the call processor 10 prompts the caller to input the area code and/or the exchange code information, as depicted in block 126. The information input is then received and stored at block 127 in the look-up table 54. Processor control then branches to flow block 128, in which event the user-programmer is prompted a second time to enter the voice message concerning the geographical region. This message is utilized later as a prerecorded message to be played in response to telephone calls to the user's telephone, which calls originate from the particular geographical region. The processor 10 digitizes and stores the programmer's voice input concerning the geographical location in the digital announcement circuit 44. The address of the announcement associated with the geographical location is also stored at this time in the tag bit field 86 of the programmed entry of the look-up table 4. This is illustrated by block 129. From block 129, the program branches to block 108 where an acknowledgment tone is transmitted to signify the successful programming of this call route.

The foregoing sets forth the major functions carried out by the CPU 38 of the call processor 10 in being programmed for carrying out the various operations in routing incoming telephone calls based upon call identification telephone numbers received with such calls. After programming the call processor 10 in the noted manner, incoming calls are routed according to the manner programmed by the telephone user. While not shown in block 62, incoming telephone calls not accompanied by call identification telephone numbers are detected as such, and processed according to conventional routines for connection to the desired called party.

Figure 4A:
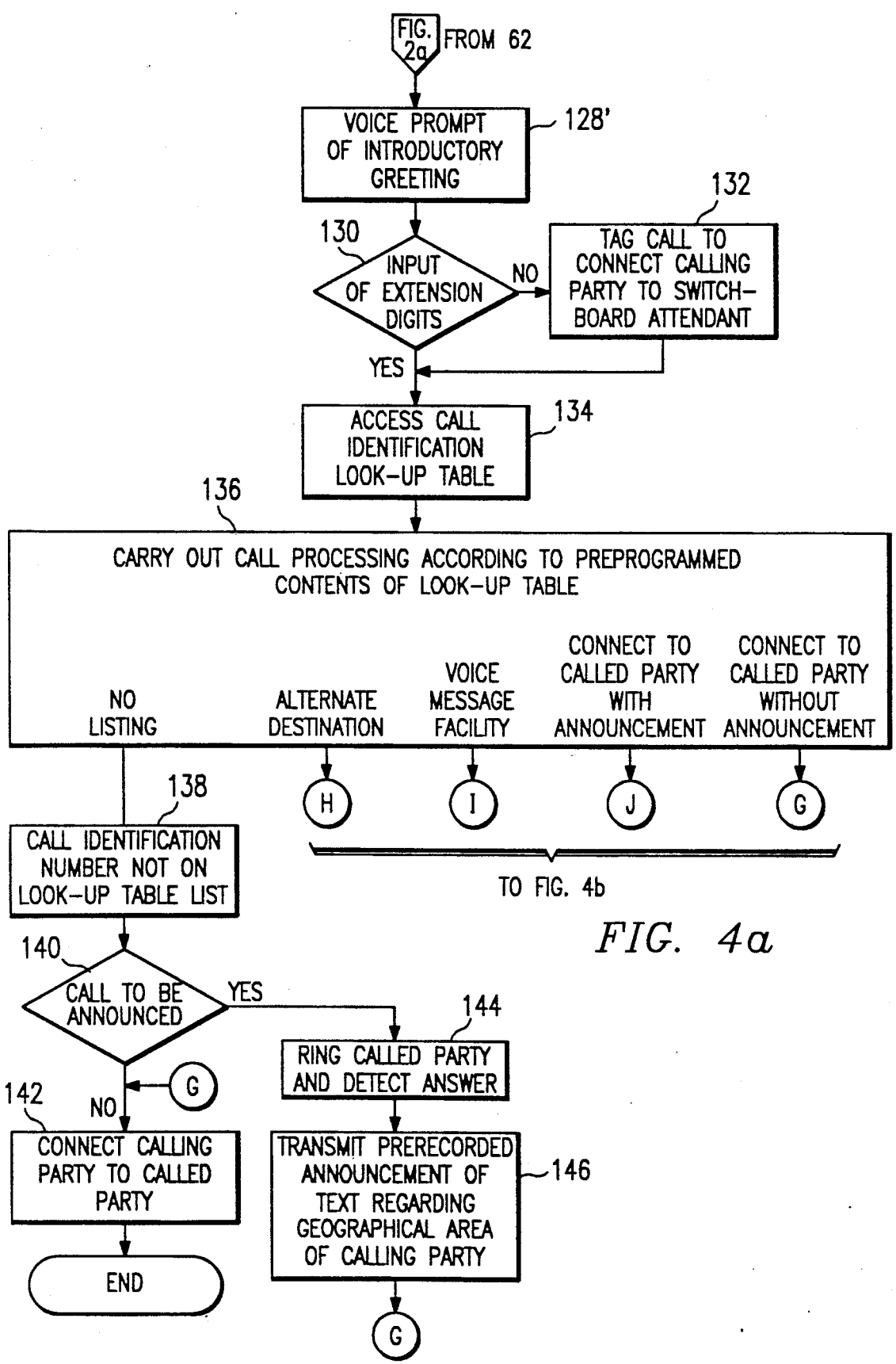
FIGS. 4a and 4b illustrate the call processing actions taken by the communication system in routing an incoming call according to an exemplary preprogrammed call routing sequence.
Figure 4B:
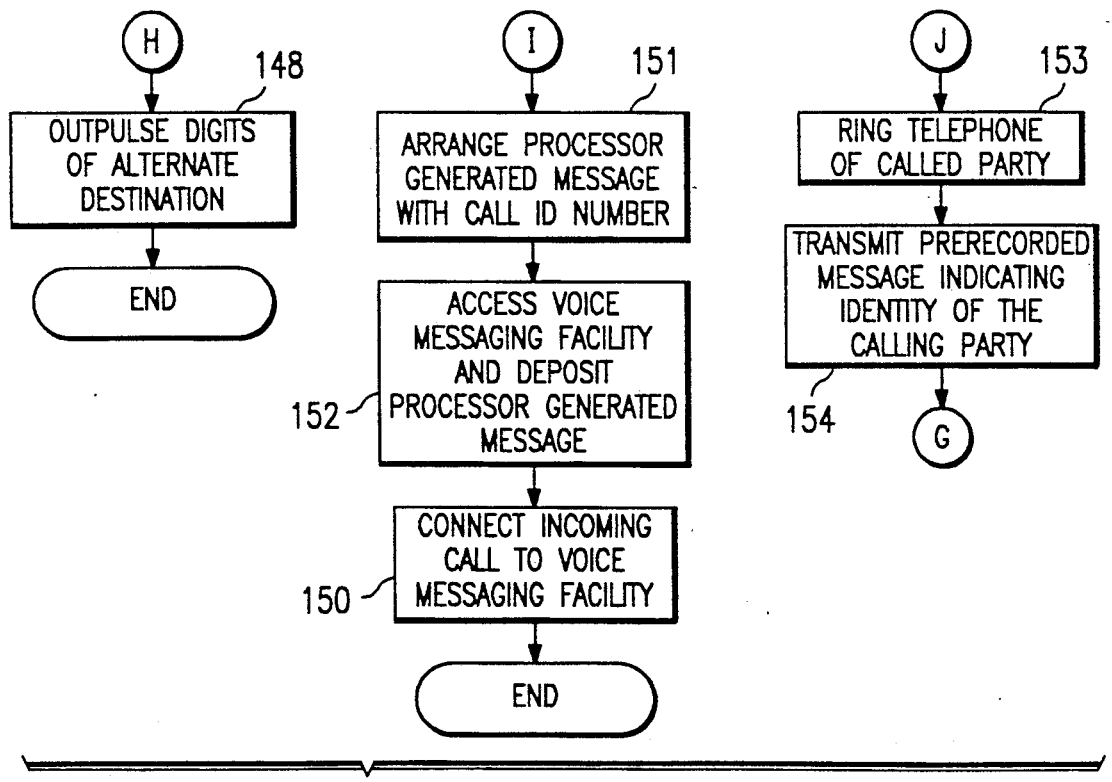

FIGS. 4a and 4b illustrate an exemplary call routine for processing incoming calls having associated call identification telephone numbers. Entry to program flow block 128' (FIG. 4a) is from block 62 (FIG. 2a), after decoding the call identification number. According to block 128, a voice prompt is transmitted to the calling party with an introductory greeting concerning the business entity reached and instructions to input the telephone extension of the called party with whom communications are desired. The receipt of the extension number is tested 130, and on a negative determination thereof, program control is branched to block 132 where the call is tagged for connection to a call completion assistant, such as the switchboard attendant 28. The result of the instructions performed pursuant to either block 130 or 132 result in the carrying out of the instructions of block 134. Here, the call processor 10 consults the call identification look-up table 54 to determine the proper call route to be taken, as programmed by the programmer and telephone set user of the on-premises switching system 14. As noted above, the call identification look-up table 54 may include a sequential list of telephone numbers of potential callers, each cross-referenced to a symbol or instruction which denotes a routing for controlling the call processor 10 to connect the respective incoming calls to destinations prescribed by the called party. As noted, many types of look-up tables may be employed by those skilled in the art and readily implemented for use with the instant invention.

After the call identification number has been cross-referenced in the look-up table 54 for finding the particular call route function, such function is carried out, as noted in program flow block 136. If, after consulting the call identification list, the call identification telephone number is not found (block 138), call processing proceeds to block 140 where it is determined whether or not the programmer has programmed the call processor 10 to announce the geographical location of such call. On a negative determination, the call is completed to the called party, as noted by block 142. After completing the call, the call processor 10 proceeds with other routine functions in monitoring the processor inputs to detect new calls, to signal the on-premises switching system 14, etc.

Returning to block 140, if the programmer has programmed the call processor 10 to announce the geographical location of the unlisted call identification telephone number, program flow is branched to block 144 where the telephone set of the called party is rung, and an answer is detected. According to block 146, the call processor 10 then selects from the digital recording facility 52 a prerecorded phrase which is associated with the area code and the exchange code of the calling party, as referenced by the call identification telephone number. The digital recording facilities 52 can be provided with a listing of all national and international area codes, each of which is cross-referenced with a particular geographical area, such as a state, territory, province, etc. In this manner, when the area code portion of the call identification telephone number is decoded, it can be cross-referenced in such listing to determine the geographical area from which the incoming call originated. For local call identification numbers which may not include an area code portion, the absence thereof can be utilized to signify the local area code. Indeed, a local area code can be inserted into the call identification number and utilized in the list to define the local geographical area for providing the phrase according to block 146. Indeed, the voice message transmitted according to block 146 may include the verbal phrase of the area code itself and the geographical area, such as "Area code 312, Illinois". After transmission of the geographical information, the call is completed to the subscriber, as noted in block 142. In this manner, the called party is made aware of the general origin of the call. This is especially important in a business, such as in a sales organization, where numerous long distance telephone calls and communications are conducted every day.

With reference back to program flow block 136, in the event the call identification telephone number associated with the exemplary incoming call has been programmed for routing to an alternate destination, program flow branches to block 148 of FIG. 4b. Here, the call is completed directly to the alternate destination, as programmed by the telephone user associated with the on-premises switching system 14. As noted above, the alternate destination may be preprogrammed for routing to a secretary, the switchboard attendant, a colleague, etc. The call is completed in this call route sequence by outpulsing the telephone or extension number of the alternate destination to the PBX 14 on an idle subscriber line 22.

Incoming calls preprogrammed to be connected to a voice messaging facility take a route determined by program flow routine 150. The steps necessary to effect such a connection are described in detail in the noted co-pending application, "Integration of Voice Store and Forward Facility." During the accessing and connection to the voice store and forward facility 50, the call processor arranges a voice message using the call identification
for recording with the facility 50, prior to the recording of the calling party's message. The composite processor arranged message may be in the nature of "Your calling party's telephone number is 312-519-9850". The message is received and recorded by the facility 50 prior to the verbal message deposited by the calling party. In this manner, the called party is made aware of the identity of the calling party in the event the calling party failed to verbalize his or her telephone number. This feature is shown as block 151 in FIG. 4b.

The processor-generated message can be formed by utilizing a standard predigitized phrase "Your calling party's telephone number is . . . ", and storing the same in the digital announcement circuit 44. The predigitized verbal message is arranged as a phrase and connected with the individual verbalized numbers corresponding to the call identification digits. The composite verbal phrase is transmitted to the voice messaging facility in analog form of the calling party's voice message. Such processor action is shown as block 152. In any event, when the calling party is connected to such a messaging facility 50, a voice message can be deposited by the calling party for later retrieval by the called party.

In the event the incoming call is of the type designated by the programmer of the call processor system 10 for direct connection to the dialed destination, program flow is directed to block 153. The functions carried out according to block 153 include the ringing of the user's telephone number and the detection of an answer, such as an off-hook condition. Next, and as noted by block 154, the message prerecorded in connection with the programming block 120 (FIG. 2b) is recalled from the recording facility 52 and transmitted to the called party. As described above, such message identifies the calling party, preferably by name and/or geographical area, thereby informing the called party of the best identity of the calling party. After transmission of the identification message, the routing of the incoming call is completed by connection to the called party, as noted by block 142.

From the foregoing, disclosed is apparatus and a method for programming a call processor to route incoming calls according to the identity of the calling party. The technical advantage of such a feature is that calls can be automatically routed to predetermined destinations, without substantial intervention by the intended called party. Indeed, the telephone user or programmer of the call processor can preselect destinations for various calling parties to optimize the user's time and efficiency. An additional technical advantage realized by the present invention is that the user of the call processor can update or modify the call routing destination as the needs change. Yet another technical advantage of the invention is that the called party can be apprised of the identity of the incoming calling party without requiring a different type of telephone set and its accompanying reoccurring expenses.

While the preferred embodiment of the invention has been described with reference to a specific call processor system and method, it is to be understood that many changes in detail may be made as a matter of engineering choices without departing from the spirit and scope of the invention, as defined by the appended claims.

What is claimed is:

1. A method for controlling routing of a telephone call, comprising the steps of:
   programming a route directory with at least one potential calling party identity to be associated with one of a plurality of destinations including an intended called party and a voice messaging facility;
   receiving an incoming telephone call directed to a switching system and receiving an identity of a calling party placing the incoming call;
   accessing the route directory in response to the incoming call to determine the destination route of the incoming call based upon the identity of the calling party; and
   connecting the incoming call to the destination specified in the route directory.

2. The method of claim 1, further including providing a route directory for a plurality of telephone users of the switching system.

3. The method of claim 2, further including allowing each said telephone user with a capability of modifying the route directory to reroute incoming telephone calls to different destinations.

4. The method of claim 1, further including accessing the route directory using a telephone number as the identity of the calling party, and executing a routine to connect the incoming call to a destination cross-referenced to the telephone number.

5. The method of claim 1, further including arranging a message having a call identification number content, and transmitting the arranged message to the voice messaging facility.

6. The method of claim 5 further including causing the voice messaging facility to record the arranged message prior to a recording of a message deposited by the calling party.

7. The method of claim 1, further including connecting the incoming call to an alternate destination comprising a person other than a called party who has a destination defined in the route directory.

8. A call processor for carrying out the steps of claim 1.

9. A method for controlling routing of a telephone call, comprising the steps of:
   receiving an incoming telephone call directed to a switching system and receiving calling party location identifying information of a calling party placing the incoming call;
   storing the identity of the calling party in a route directory of a call processor in association with one of a plurality of destinations;
   accessing the route directory in response to the incoming call to determine the destination route of the incoming call based upon the location of the calling party;
   connecting the incoming call to the destination specified in the route directory; and
   transmitting to a called party a prerecorded voice message identifying the geographical area defining the area of origination of the incoming call.

10. The method of claim 9, further including transmitting to the called party a voice message identifying the geographical area as a numerical area code.

11. A method for controlling routing of a telephone call, comprising the steps of:
   receiving an incoming telephone call directed to a switching system and receiving an identity of a calling party placing the incoming call;
   storing the identity of the calling party in a route directory of a call processor in association with one of a plurality of destinations;
   accessing the route directory in response to the incoming call to determine the destination route of the incoming call based upon the identity of the calling party;
   connecting the incoming call to the destination specified in the route directory; and
   programming said call processor with an area code look-up table for cross-referencing a voice message which is transmitted to the called party concerning the geographical area of origination of the incoming call.

12. A method for controlling routing of a telephone call, comprising the steps of:
   on the premises where an intended called party is located, generating in a call processor an accessible list of numbers uniquely identifying calling parties;
   associating each said number with a desired destination selected from a plurality of destinations including the intended called party; and
   accessing said accessible list of numbers in response to an incoming call and routing the call to the destination referenced in said accessible list of numbers.

13. The method of claim 12, further including generating a look-up table for each of a pluraliy of potential called parties associated with the call processor.

14. The method of claim 12, further including providing access to said call processor by a user thereof for generating said look-up table.

15. The method of claim 14, further including providing capabilities in said call processor for allowing the user to modify the look-up table to thereby change said destinations.

16. The method of claim 12, further including providing capabilities in said call processor for adding identification and deleting identification numbers from said list.

17. The method of claim 12, further includin providing a memory for storing voice prompts input to said call processor by a user thereof for subsequent use by the user in responding to an incoming call.

18. The method of claim 17, further including storing in the memory voice prompts which are transmitted to the called party in response to the incoming call.

19. A call processor for carrying out the steps of claim 12.

20. A method of controlling routing of a telephone call, comprising the steps of:
providing a programming mode in a call processor for allowing a user to whom a call can be directed to program the call processor to control the routing of incoming calls directed to said user; and
providing a program within said call processor for allowing said user to enter calling party identifying indicia and a call route destination associated with each said identifying indicia, the call route desitnation selected from a plurality of destinations including said user and a voice messaging facility.

21. The method of claim 20 further including providing in said program a call processing routine for receiving incoming calls and associated call identification telephone numbers, and comparing the call identification telephone numbers with said preprogrammed calling party identifying indicia to determine the call route for the incoming call.

22. The method of claim 20, further including recording a voice message of a user of the call processor to define a voice prompt for later use in assisting in the call routing of an incoming call.

23. A method for controlling routing of a telephone call, comprising the steps of:
providing a programming mode in a call processor for allowing a user to program the call processor to control the routing of incoming calls directed to the user; and
providing a program within said call processor for allowing the user to enter calling party identifying indicia and a call route desitnation associated with each said identifying indicia;
storing voice messages associated with respective geographical areas;
matching the call identification number of an incoming call with one said message; and
transmitting said matched message to a called party.

24. The method of claim 23, further including storing an area code as an indication of the geographical area.

25. A call processor for carrying out the steps in accordance of the method of claim 20.

26. A call processor for controlling routing of a telephone call, comprising:
a receiver for receiving a call identification number identifying a calling party;
a memory for storing the call identification number;
a look-up table programmable by a user of the call processor for listing indicia for identifying calling parties and for cross-referencing a destination to said indicia, said destination selected from a plurality of destination including the user and a voice messaging facility;
a comparator for comparing a call identification number received in association with an incoming call to said call processor with entries in said look-up table; and
call route directing apparatus for connecting the incoming call to the destination cross-referenced in said look-up table on an affirmative comparison of the call identification number via said calling party identifying indicia.

27. The call processor of claim 26, further including a look-up table for each of a plurality of users of said call processor such that each user can program the processor to define destinations of incoming calls based upon identities of respective calling parties.

28. The call processor of claim 26, further including a voice recording unit for recording voice messages to be transmitted to the users during incoming calls so that the users are informed of information concerning the call.

29. A call processor for controlling routing of a telephone call, comprising:
a receiver for receiving a call identification number identifying a calling party;
a memory for storing the call identification number;
a look-up table programmable by a user of the call processor for listing indicia for identifying calling parties and for cross-referencing a destination to said indicia;
a comparator for comapring a call identification number received in association with an incoming call to said call processor with entries in said look-up table;
call route directing apparatus for connecting the incoming call to the destination cross-reference din said look-up table on an affirmative comparison of the call identification number via said calling party identifying indicia;
a voice recording unit for recording voice messages to be transmitted to the users during incoming calls so that the users are informed of information concerning the call; and
said voice recording unit comprising a plurality of messages each related to a geographical area, and further including means for cross-referencing an area code portion of a received call identification number with one said message.

30. The call processor of claim 29, wherein said voice recording unit includes a plurality of voice messages regarding area codes.

31. The call processor of claim 26, further including a voice prompter for prompting a programmer during programming of the look-up table of plural optional destination for cross-referencing to the calling party identifying indicia.

32. A method for controlling routing of a telephone call, comprising the steps of:
programming a route directory with at least one potential calling party indentity to be associated with one of a plurality of destinations including an intended called party;
receiving an incoming telephone call directed to a switching system and receiving an identity of a calling party placing the incoming call without requiring a data link separate from the data line on which the incoming telephone call is being made;
accessing the route directory in response to the incoming call to determine the destination route of the incoming call based upon the identity of the calling party; and connecting the incoming call to the destination specified in the route directory.

33. The method of claim 32, and further comprising the steps of:

prerecording a voice message referenced to at least one of a plurality of potential caller identiries; and transmitting to the user the voice message during an incoming call from a caller having a corresponding identity so that the user is informed of the identity of the caller.

* * * * *

UNITED STATES PATENT AND TRADEMARK OFFICE
CERTIFICATE OF CORRECTION

PATENT NO. : 5,029,196

DATED : July 2, 1991

INVENTOR(S) : Sanford J. Morganstein

It is certified that error appears in the above-identified patent and that said Letters Patent is hereby corrected as shown below:

Column 2 line 64, between "the" and "accompanying" delete the comma.

Column 3, line 18, between "Particularly," and "shown" delete "there is".

Column 4, line 68 (last line), change "referenc" to --reference.--.

Column 10, line 9, between "exemplary" and "by", insert --programmable routing options, the input of the digit "5"--.

Column 12, lines 35-37, between "identification" and "for recording", insert --number--.

Column 13, line 53, Claim 3, line 2, between "each" and "telephone", delete "said".

Column 15, lines 2- 3, Claim 16, lines 2-3, between "identification" and "and", insert --numbers to--;

Column 15, lines 22-23, Claim 20, lines 10-11, change "desitnation" to --destination--;

Column 15, line 25, Claim 21, line 1, between "20" and "further", insert a comma;

UNITED STATES PATENT AND TRADEMARK OFFICE
CERTIFICATE OF CORRECTION

PATENT NO. : 5,029,196
DATED : July 2, 1991
INVENTOR(S) : Sanford J. Morganstein It is certified that error appears in the above-identified patent and that said Letters Patent is hereby corrected as shown below:

Column 15, line 44, Claim 23, line 9, change "desitnation" to --destination--;

Column 15, line 65, Claim 26, line 10, change "of destination including" to --of destinations including--.

Column 16, line 32, Claim 29, line 15, change "cross-reference din" to --cross-referenced in--;

Column 16, line 63, Claim 32, line 10, change "data line" to --data link--.

Signed and Sealed this

Sixteenth Day of March, 1993

*Attest:*

STEPHEN G. KUNIN

*Attesting Officer*  *Acting Commissioner of Patents and Trademarks*